United States Patent
Jones et al.

(10) Patent No.: US 9,971,576 B2
(45) Date of Patent: May 15, 2018

(54) SOFTWARE DEVELOPMENT ENVIRONMENT AND METHOD OF COMPILING INTEGRATED SOURCE CODE

(71) Applicant: Nvidia Corporation, Santa Clara, CA (US)

(72) Inventors: Stephen Jones, Santa Clara, CA (US); Mark Hairgrove, Santa Clara, CA (US); Jaydeep Marathe, Santa Clara, CA (US); Vivek Kini, Santa Clara, CA (US); Bastiaan Aarts, Santa Clara, CA (US)

(73) Assignee: Nvidia Corporation, Santa Clara, CA (US)

( * ) Notice: Subject to any disclaimer, the term of this patent is extended or adjusted under 35 U.S.C. 154(b) by 117 days.

(21) Appl. No.: 14/085,649

(22) Filed: Nov. 20, 2013

(65) Prior Publication Data

US 2015/0143347 A1 May 21, 2015

(51) Int. Cl.
*G06F 8/30* (2018.01)
*G06F 8/41* (2018.01)
*G06F 9/45* (2006.01)
*G06F 9/44* (2018.01)

(52) U.S. Cl.
CPC . *G06F 8/41* (2013.01); *G06F 8/30* (2013.01)

(58) Field of Classification Search
None
See application file for complete search history.

(56) References Cited

U.S. PATENT DOCUMENTS

| 6,149,318 A * | 11/2000 | Chase | G06F 8/437 |
| | | | 714/E11.209 |
| 8,531,471 B2 * | 9/2013 | Chen | G06T 1/20 |
| | | | 345/541 |
| 2005/0015759 A1 * | 1/2005 | Zatloukal | G06F 8/47 |
| | | | 717/140 |
| 2008/0109795 A1 * | 5/2008 | Buck | G06F 8/443 |
| | | | 717/137 |

(Continued)

OTHER PUBLICATIONS

Ahmad Abdelfattah, "GPU Programming Using CUDA C/C++", Sep. 18, 2013, (whole document).*

(Continued)

*Primary Examiner* — Chat Do
*Assistant Examiner* — Douglas Slachta
(74) *Attorney, Agent, or Firm* — Iain Cunningham; Parker Justiss, P.C.

(57) ABSTRACT

A software development environment (SDE) and a method of compiling integrated source code. One embodiment of the SDE includes: (1) a parser configured to partition an integrated source code into a host code partition and a device code partition, the host code partition including a reference to a device variable, (2) a translator configured to: (2a) embed device machine code, compiled based on the device code partition, into a modified host code, (2b) define a pointer in the modified host code configured to be initialized, upon execution of the integrated source code, to a memory address allocated to the device variable, and (2c) replace the reference with a dereference to the pointer, and (3) a host compiler configured to employ a host library to compile the modified host code.

13 Claims, 3 Drawing Sheets

(56) References Cited

U.S. PATENT DOCUMENTS

| | | | | |
|---|---|---|---|---|
| 2012/0075316 A1* | 3/2012 | Kim | .......................... | G06T 1/20 |
| | | | | 345/522 |
| 2012/0324170 A1* | 12/2012 | McKenney | ......... | G06F 12/0891 |
| | | | | 711/135 |
| 2013/0167130 A1* | 6/2013 | Alvanos | ................ | G06F 9/4436 |
| | | | | 717/160 |
| 2014/0149710 A1* | 5/2014 | Rogers | .................. | G06F 9/3887 |
| | | | | 711/170 |
| 2014/0310484 A1* | 10/2014 | Giroux | .................... | G06F 12/08 |
| | | | | 711/154 |

OTHER PUBLICATIONS

Cyril Zeller, "CUDA C/C++ Basics", Supercomputing 2011 Tutorial, 2011 (whole document).*

Tristan Perryman, Paul Kelly and Tony Field, "Runtime Compilation with NVIDIA Cuda as a Programming Tool", Jul. 10, 2012 (whole document), retrieved from: http://web.archive.org/web/20120710230412/http://www3.imperial.ac.uk/pls/portallive/docs/1/45421696.PDF.*

Thomas B. Jabline et al., Automatic CPU-GPU Communication Management and Optimization, 2011, ACM.*

\* cited by examiner

SOFTWARE DEVELOPMENT ENVIRONMENT AND METHOD OF COMPILING INTEGRATED SOURCE CODE

STATEMENT OF FEDERALLY FUNDED RESEARCH

This disclosure was made with Government support under LLNS subcontract B599861 awarded by DOE. The Government has certain rights in this disclosure.

TECHNICAL FIELD

This application is directed, in general, to a software development environment (SDE) and, more specifically, to the compiling of integrated source code.

BACKGROUND

Many modern computing systems include multiple processors optimized for certain processing tasks. For example, a common architecture includes a central processing unit (CPU) and a graphics processing unit (GPU). In this architecture, an application executes on the CPU and generates graphics data and rendering instructions for the GPU to execute for rendering a scene for display. The GPU is optimized for highly parallelized processing tasks, making it well suited for graphics processing. Some development platforms make the parallel computational elements of the GPU available for applications beyond graphics rendering. Other applications that can benefit from optimizations in the GPU include physics modeling and simulation, computational biology, cryptography, and others.

To realize the benefits of GPU computing, applications need access to languages and libraries for carrying out sequential tasks on the CPU, or "host," and access to languages and libraries for carrying out parallel tasks on the GPU, or "device." Given access to both the host and device, a developer can apportion processing tasks between the processors. An SDE can provide this access through a variety of libraries and application programming interfaces (APIs) that allow host and device portions of an application to blend into a single body of source code. Such a body of code is referred to as integrated source, in that host code portions and device code portions are integrated into a single source code file. Such an SDE is sometimes referred to as a source integrated heterogeneous programming environment. "Heterogeneous" refers to the integration of source code that executes on at least two different types of processors. For example, certain source code can only execute on a CPU, other source code may only execute on a GPU, while yet other source code can execute on either a CPU or GPU.

SUMMARY

One aspect provides an SDE. In one embodiment, the SDE includes: (1) a parser configured to partition an integrated source code into a host code partition and a device code partition, the host code partition including a reference to a device variable, (2) a translator configured to: (2a) embed device machine code, compiled based on the device code partition, into a modified host code, (2b) define a pointer in the modified host code configured to be initialized, upon execution of the integrated source code, to a memory address allocated to the device variable, and (2c) replace the reference with a dereference to the pointer, and (3) a host compiler configured to employ a host library to compile the modified host code.

Another aspect provides a method of compiling integrated source code having host code and device code. In one embodiment, the method includes: (1) defining a pointer to a device variable in the host code, the device variable having a reference therein, (2) translating the reference to a dereference to the pointer, (3) mapping the pointer to the device variable, and (4) compiling the host code.

Yet another aspect provides a system. In one embodiment, the system includes: (1) a memory communicably coupled to a data bus and configured to store: (1a) an integrated source file partitionable into a host code portion and a device code portion, the host code portion including a reference to a device variable, (1b) a device library according to which the device code portion is compilable to device machine code, and (1c) a host library according to which the host code portion is compilable to a host executable, and (2) a processor communicably coupled to the data bus, configured to gain access to the memory via the data bus, and operable to execute an SDE having a translator configured to: (2a) embed the device machine code into a modified host code, (2b) define a pointer in the modified host code configured to be initialized, upon execution of the host executable, to a memory address allocated to the device variable, and (2c) replace the reference with a dereference to the pointer.

BRIEF DESCRIPTION

Reference is now made to the following descriptions taken in conjunction with the accompanying drawings, in which.

DETAILED DESCRIPTION

One example of a SDE that provides for GPU computing is the compute unified device architecture (CUDA), developed by NVIDIA Corporation of Santa Clara, Calif. CUDA is a parallel computing platform and programming model that delivers the parallel computing toolset of CUDA GPUs to developers, scientists, and researchers. CUDA allows high level languages such as C, C++ or Fortran to be compiled and executed on the GPU without the burdens of assembly language. CUDA C++ is a source integrated heterogeneous programming environment that allows the combination of host code and device code into a single integrated source code. The CUDA C++ environment typically includes a device compiler that identifies device code portions and compiles it into machine code that can execute on the GPU. The compiled machine code can then be embedded in the host code portions. Additionally, the CUDA C++ environment also includes a host compiler for compiling the host code and embedded device machine code into an executable for processing on the CPU. As the CPU moves through the sequential portions of the application and reaches an embedded portion, the processing task is directed to the GPU for parallel processing.

A common pitfall with integrated source is the need for host code to access device variables. Host variables and device variables are distinctly marked and allocated for in memory. CUDA C++ generally does not allow direct access to device variables by host code. Rather, special APIs are available for gaining access to device variables from host code. These APIs are often cumbersome, clutter the integrated source, and can present maintenance issues further down the software lifecycle.

It is realized herein that the CUDA SDE can translate host code such that direct references to device variables are automatically resolved and direct access granted outside of the traditional special API. The translation occurs on the CUDA "front end," before the host code is compiled. It is realized herein that a pointer should be created for each device variable to which direct access is needed. It is also realized herein that each direct reference to the device variable in the host code should be replaced with pointer dereference expressions that dereference the respective pointers.

It is further realized herein that the pointers must be mapped and initialized to the memory locations for the respective device variables before the device variables can be used in the host code. The mapping should occur at startup of the host code, where the pointers are mapped to the name of their corresponding device variables. When the device code is loaded, the pointers are then initialized to the memory location of the respective device variables.

It is also realized herein that initialization can be ensured by inserting a call to initialize the device runtime environment before each direct access call. This can be achieved by a comma expression.

Figure 1:
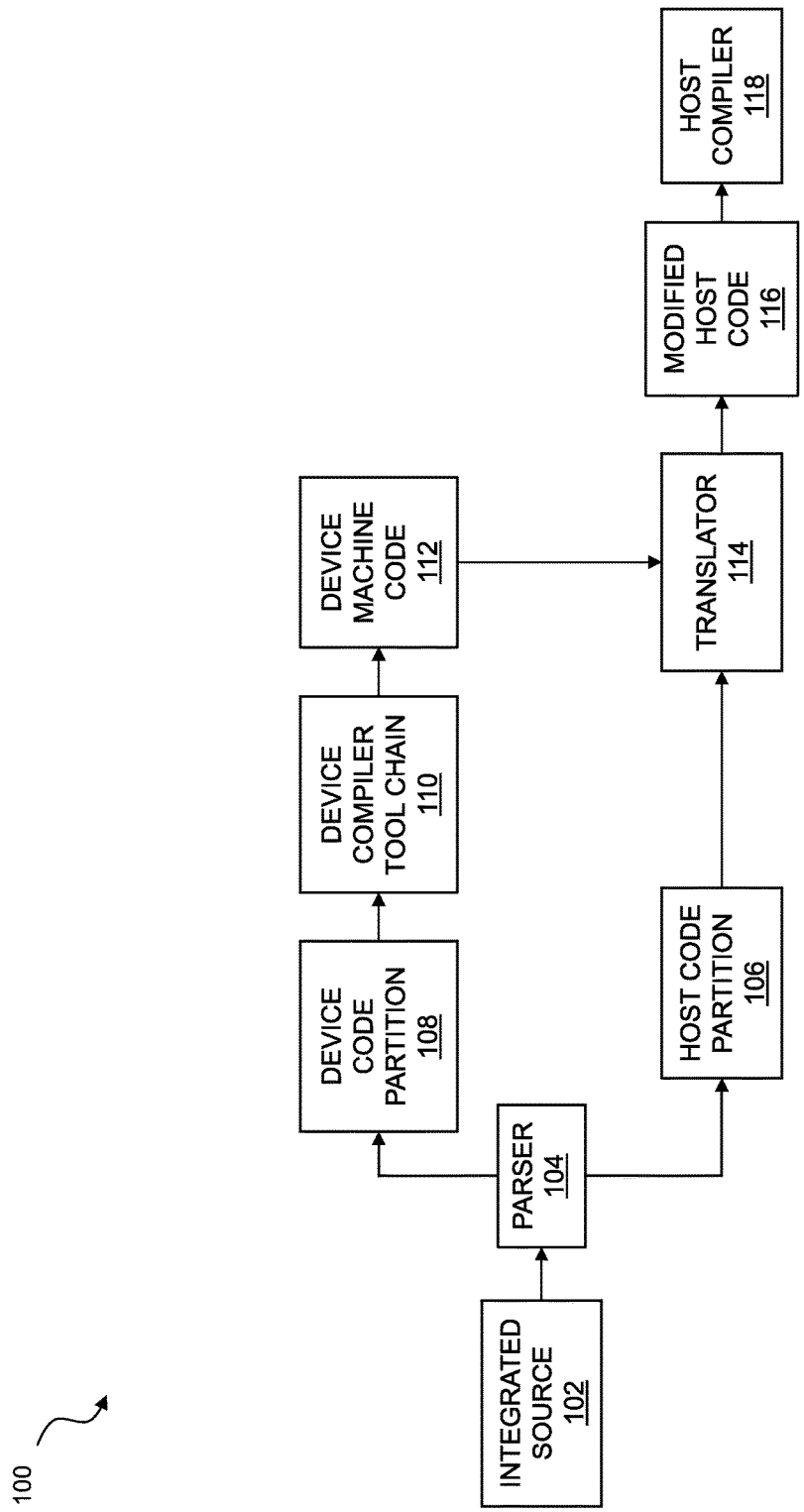
FIG. 1 is a block diagram of one embodiment of an SDE.

FIG. 1 is a block diagram of one embodiment of an SDE 100. SDE 100 is operable to compile an integrated source 102 such that the resulting executable can heterogeneously execute on a host processor and a device processor. SDE 100 includes a parser 104, a device compiler tool chain 110, a translator 114, and a host compiler 118.

Parser 104 receives integrated source 102 and partitions it into a device code partition 108 and a host code partition 106. The various blocks of code in integrated source 102 are distinctly marked as device code or host code by certain keywords or directives. This marking allows parser 104 to process integrated source 102 and generate the partitions. The partitioning is necessary as device code partition 108 and host code partition 106 are processed differently by SDE 100.

Device code partition 108 is processed by device compiler tool chain 110. Device compiler tool chain 110 is configured to employ device code partition 108 to generate device machine code 112 that is executable on a device, such as a GPU.

Host code partition 106 is processed by translator 114. Translator 114 is configured to modify host code partition 106 to prepare it for processing by host compiler 118. Host code partition 106 includes at least one direct reference to at least one device variable. Translator 114 generates a modified host code 116 that automatically resolves any direct references to device variables and allows modified host code 116 to gain direct access to the device variables without going through the traditional device variable API. Translator 114 is also configured to embed device machine code 112 generated by device compiler tool chain 110 into modified host code 116. Modified host code 116 is then processed as usual by host compiler 118, resulting in an executable that includes portions that execute on the host and portions that execute on the device.

Figure 2:
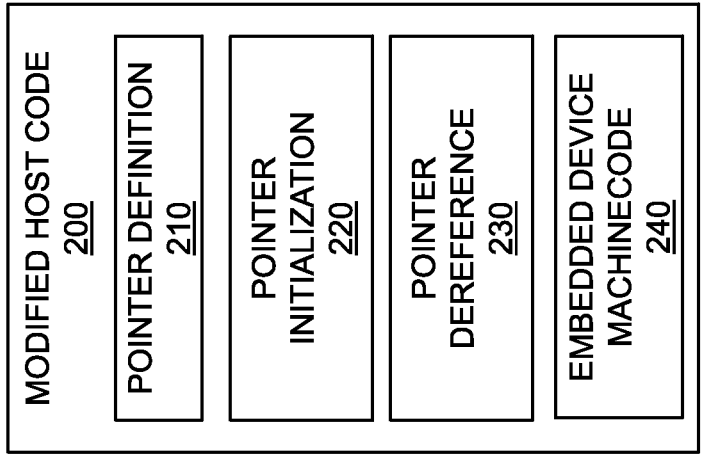
FIG. 2 is a block diagram of one embodiment of a modified host code.

FIG. 2 is a block diagram of one embodiment of a modified host code 200. Modified host code 200 is a translation of a host code partition of an integrated source file. The integrated source file includes direct references to a device variable. Modified host code 200 includes a pointer definition 210 for a pointer to be used in place of the direct call to the device variable. Each occurrence of the direct call to the device variable is replaced by a pointer dereference 230.

Prior to use of the pointer, the pointer is initialized to the memory location of the device variable. The initialization is achieved by the insertion of a pointer initialization 220 into modified host code 200. Pointer initialization 220 is placed in modified host code 200 such that the initialization occurs at startup.

Modified host code 200 also includes embedded device machine code 240 that is submitted along with pointer definition 210, pointer initialization 220, and pointer dereference 230 to a host compiler for processing.

Figure 3:
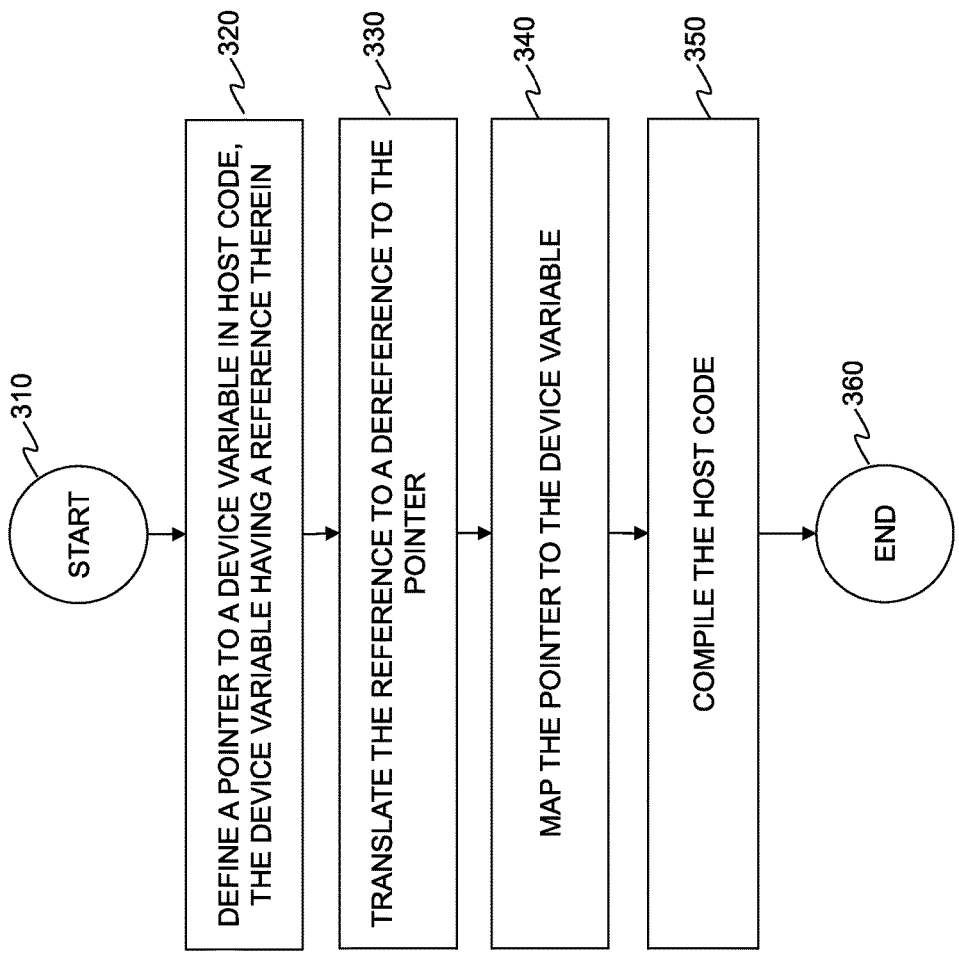
FIG. 3 is a flow diagram of one method of compiling integrated source code.

FIG. 3 is a flow diagram of one embodiment of a method of compiling integrated source code. The integrated source code is partitioned into a host code partition and a device code partition. The method begins in a start step 310. In a defining step 320, a pointer is created in the host code that will point to a device variable. The device variable is otherwise not directly accessible to the host code without using a device API. The host code includes at least one reference, or call for direct access, to the device variable. In a translation step 330, each reference to the device variable in the host code is translated to a dereference to the pointer created in defining step 320. Calls to the device variable are essentially replaced with calls to the pointer.

In certain embodiments, the method includes inserting additional calls to invoke the device API before each reference to the device variable. By invoking the device API, the pointer is ensured to have been initialized to the memory location of the device variable before it is ever used. Invoking the device API causes the runtime environment to use the registration to initialize the pointer. The device API is invoked by inserting a comma expression that combines the dereference and a call to initialize the runtime environment.

The pointer is mapped to the device variable in a registration step 340. The mapping is achieved by inserting calls in the host code that will execute at host startup. The inserted calls, when executed, register the pointer and device variable with the runtime environment. The registration allows the runtime environment to initialize the pointer to the memory location of the device variable upon the first call to the device API.

The modified host code is then compiled in a compilation step 350. The method ends in a step 360.

Those skilled in the art to which this application relates will appreciate that other and further additions, deletions, substitutions and modifications may be made to the described embodiments.

What is claimed is:

1. A software development environment system, comprising:
   a memory; and
   a processor coupled to said memory, said processor configured to provide:
   a parser to partition an integrated source code into a host code partition executable on a host processor and a device code partition executable on a processor of a device, said host code partition including a reference to a device variable, wherein said reference is a call for direct access to said device variable and said device variable is a variable located in a memory of said device;

a translator to:

embed device machine code, compiled based on said device code partition, into a modified host code, define a pointer in said modified host code, insert a call in said modified host code to register said pointer with a runtime environment, thereby causing said pointer to be initialized, upon execution of said integrated source code, to a memory address allocated to said device variable, and replace said reference with a dereference to said pointer, and insert a call to initialize a runtime environment before said dereference, wherein said call to initialize a runtime environment and said dereference are combined in a comma expression; and a host compiler to employ a host library to compile said modified host code.

2. The software development environment system as recited in claim 1, wherein said translator is operable to identify said reference based on a keyword.

3. The software development environment system as recited in claim 1, wherein said runtime environment is a CUDA runtime environment.

4. A method of compiling integrated source code having host code and device code for a device, comprising:

defining a pointer to a device variable in said host code, said device variable having a reference therein, wherein said reference is a call for direct access to said device variable and said device variable is a variable located in a memory of said device;

translating said reference to a dereference to said pointer;

mapping said pointer to said device variable, wherein said mapping includes inserting a call to register said pointer with a runtime environment, thereby causing said pointer to initialize to a memory address for said device variable at execution of said device code;

injecting an initialization call for a runtime environment before said dereference, wherein said initialization call is combined with said dereference in a comma expression; and compiling said host code.

5. The method as recited in claim 4 wherein said initialization call includes a call to initiate a CUDA runtime environment.

6. The method as recited in claim 4 wherein said translating includes identifying said reference by a device keyword.

7. The method as recited in claim 4 further comprising compiling said device code and embedding resulting machine code in said host code.

8. A system, comprising:

a memory communicably coupled to a data bus and configured to store:

an integrated source file partitionable into a host code portion and a device code portion, said host code portion including a reference to a device variable, wherein said reference is a call for direct access to said device variable and said device variable is a variable located in a memory of a device, a device library according to which said device code portion is compilable to device machine code, and a host library according to which said host code portion is compilable to a host executable, and a processor communicably coupled to said data bus, configured to gain access to said memory via said data bus, and operable to execute a software development environment (SDE) having a translator configured to:

embed said device machine code into a modified host code, define a pointer in said modified host code, insert a call in said modified host code to register said pointer with a runtime environment, thereby causing said pointer to be initialized, upon execution of said host executable, to a memory address allocated to said device variable, and replace said reference with a dereference to said pointer, and insert a call to initialize a runtime environment before said dereference, wherein said call to initialize a runtime environment and said dereference are combined in a comma expression.

9. The system as recited in claim 8 wherein said integrated source file is a CUDA C++ source file.

10. The system as recited in claim 8 wherein said SDE is a source integrated heterogeneous programming environment.

11. The system as recited in claim 8 wherein said SDE further comprises a host compiler configured to employ said host library to compile said modified host code.

12. The system as recited in claim 8 wherein said SDE further comprises a parser operable to partition said integrated source file into said host code portion and said device code portion.

13. The system as recited in claim 12 wherein said parser is configured to identify said reference to said device variable.

* * * * *